Patented Aug. 20, 1929.

1,725,742

UNITED STATES PATENT OFFICE.

JAMES A. SINGMASTER, OF BRONXVILLE, NEW YORK.

ARTIFICIAL-SILK FILAMENT AND METHOD OF MAKING SAME.

No Drawing. Application filed September 28, 1927. Serial No. 222,685.

My invention relates to the manufacture of artificial silk filaments and has particularly for its object the manufacture of a filament of greater opacity and covering power than it has heretofore been practicable to make and my invention is based on my discovery that by thoroughly incorporating with and distributing in the plastic material which is to be formed into an artificial silk filament by forcing it through a fine orifice fine particles of inorganic pigment-like material such particles having a small area as compared with the area of the orifice employed the pigment being used in such quantity and so distributed through the mass as not to materially impair the continuity of the mass material with which it is admixed, it is possible to force the so pigmented material through the fine orifices used in forming the filaments and to produce a filament of artificial silk having incorporated in and distributed through its mass material fine particles of inorganic pigment in such manner that the continuity of the mass material of the filament is not materially impaired and by means of which the opacity and covering power of the finished filament is materially increased.

In order to promote the separation and distribution of the inorganic particles throughout the mass material I have sometimes found it advisable to use in making the mixture a distributing agent and for this purpose have used oils, for instance castor oil and substances such as dibutyl phthalate or tricresyl phosphate.

Among inorganic pigment-like particles which I have used in my process I will mention zinc oxide, carbon black, barium sulfate, iron oxide or magnesium oxide and while substances such as zinc oxide which will react with the chemicals or some of them used in the manufacture or dyeing of the filaments have an advantageous function in tending to removed traces of acids or other reactive chemicals from the filament I prefer to use particles of substances which are entirely inert to such chemicals and which consequently will remain unaltered in the finished and dyed filament. It is of course permissible and sometimes advantage- to use more than one inorganic pigment in my process and sometimes it may be advisable to use a reactive and an inert pigment the one being of course more or less eliminated in process of manufacture and the other remaining unaltered in the finished filament. The percentage of inorganic pigment-like particles to the mass of the filament to be produced will vary in accordance with the desired opacity and covering power and the character of the inorganic pigment used but must not be so great as to materially impair the continuity of the mass material of the filament and with this point in view it will be understood that a very thorough distribution and dispersion of the inorganic particles through the mass is essential. I have used inorganic pigments with good results in from one to one-tenth percent of the mass.

Having now described my invention, what I claim as new and desire to secure by Letters Patent, is:

1. The method of manufacturing artificial silk filaments of increased opacity and covering power, which consists in thoroughly incorporating in and distributing throughout the solution to be spun into filaments a small percentage of inorganic particles of a pigment-like material, the quantities and distribution of which are such that it will not materially impair the continuity of the filaments when the solution is forced through small orifices to form the filaments.

2. The method of claim 1 further characterized by the use of a distributing agent to facilitate the dispersion of the pigment-like particles throughout the solution.

3. The method of claim 1 in which the pigment-like particles employed are of such character as to be inert to the action of chemicals to which they are exposed during the manufacture dyeing or bleaching of the filaments.

4. An artificial silk filament having its opacity and covering power increased by having submerged in and widely distributed throughout its mass a small percentage of small particles of pigment-like inorganic material the quantity and distribution of the particles being such as not to materially impair the continuity of the mass of the filament.

5. An artificial silk filament having the characteristics of claim 4 in which the pigment-like particles distributed in the mass of the filament are of materials inert to the action of chemicals used in the manufacture dyeing and bleaching of the filament.

JAMES A. SINGMASTER.